United States Patent
Lankenau

[15] 3,699,702
[45] Oct. 24, 1972

[54] BOTTOM OPENING SHELLFISH TRAP

[72] Inventor: Richard F. Lankenau, 1207 Bonita Avenue, Mountain View, Calif.

[22] Filed: Feb. 8, 1971

[21] Appl. No.: 113,511

[52] U.S. Cl. ................................................. 43/100
[51] Int. Cl. ............................................. A01k 69/08
[58] Field of Search .......... 43/100, 102, 105, 65, 172

[56] References Cited

UNITED STATES PATENTS

| | | | |
|---|---|---|---|
| 3,497,989 | 3/1970 | Schultz et al. | 43/100 |
| 2,507,495 | 5/1950 | Barthel | 43/17.2 |
| 1,187,359 | 6/1916 | Martin | 43/65 |
| 3,176,427 | 4/1965 | Hershey | 43/100 |

*Primary Examiner*—Warner H. Camp
*Attorney*—Julian Caplan

[57] ABSTRACT

Shellfish trap is made of two substantially semi-cylindrical halves with the tops sloping downwardly-outwardly from the center and the sides outwardly curved so that the trap settles in the water in upright position. The halves are hinged together at the top by removable hinges and latched together at the bottom. The trap may be dumped by merely unlatching the bottom, allowing the two halves to pivot apart. For storage, the traps nest together in a stack.

4 Claims, 8 Drawing Figures

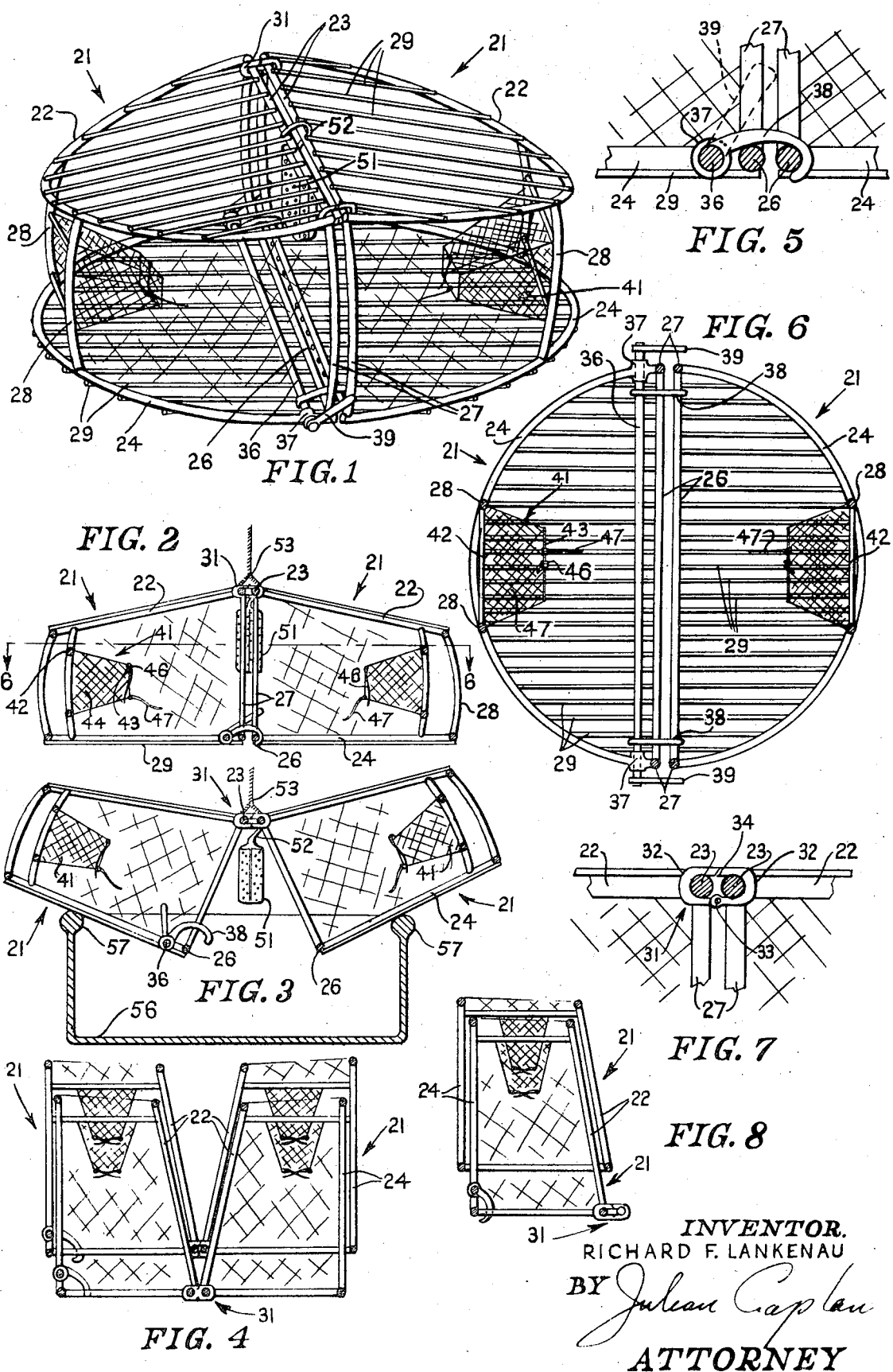

BOTTOM OPENING SHELLFISH TRAP

This invention relates to a new and improved bottom opening shellfish trap. More particularly the invention relates to a circular trap for shellfish formed of two halves hinged at the top and latched at the bottom.

A particular feature of the present invention is the convenience and rapidity with which the trap may be opened for unloading and rebaiting. Thus, after the trap has been lifted from the bottom, it is positioned over a container, unlatched and the halves spread apart at their top hinges, allowing the catch to drop into the container. There is no necessity for lifting the catch from the trap as in conventional shellfish traps. Moreover, there is no need to invert the trap as is the case in some varieties. The new bait may be inserted in a removable bait box at the same time the trap is opened for dumping. Hence the trap may be very rapidly unloaded and rebaited and the catch may be sorted as the vessel is moving to the next trap.

Another feature of the invention is the facility with which the latch may be opened from either side, permitting one man to unload the trap.

Still another feature of the invention is the economy of space in which the traps may be stacked for transportation and storage. The stacks may be formed either with the hinges in place or the hinges may be removed and the halves stacked separately.

Another feature of the invention is the formation of the tunnels through which the fish enter. Such tunnels are located and tapered in such manner that they interfit when the trap frames are stored. Thus, a larger number of traps may be stored on the deck of a vessel than is the case in conventional traps.

A further feature of the invention is the construction of the trap halves with smooth bars which run in the direction the catch falls. Thus the shellfish are not able to hang up in the trap and delay dumping.

Still another feature of the invention is the construction of the trap which insures that it rests on the bottom and does not come into position in a manner which inhibits the fish from entering. Thus, as hereinafter described in detail, the tops slant downwardly-outwardly from the middle and the sides are curved. If the trap tends to come to rest in a tilted or inverted position, the trap rolls to its proper position.

Another feature of the invention is the fact the same frame may be used for crabs, lobster, prawns, shrimp or the like merely by changing the size of mesh and the size of the tunnels through which the catch enters.

Other objects of the present invention will become apparent upon reading the following specification and referring to the accompanying drawings in which similar characters of reference represent corresponding parts in each of the several views.

In the drawings:

FIG. 1 is a perspective view of a trap in accordance with the present invention.

FIG. 2 is a side elevational view thereof showing the trap latched.

FIG. 3 is a view similar to FIG. 2 showing the trap unlatched for dumping.

FIG. 4 shows a plurality of traps nested for transportation or storage.

FIG. 5 is an enlarged, fragmentary view of the latch.

FIG. 6 is a top plan of the trap.

FIG. 7 is a fragmentary, enlarged view of the hinge.

FIG. 8 is a view similar to FIG. 4 showing the hinges removed and the individual halves of the trap stacked.

The trap of the present invention consists of two halves 21, said halves being essentially semi-cylindrical with the exceptions hereinafter noted. Each half 21 is constructed of a top semi-circular frame member 22, the ends of the semi-circle being joined by top center member 23 which comprises a diameter of the member 22. At the bottom, there is a bottom semi-circular frame 24 which is slightly larger in diameter than the member 22 in order to render the trap more stable. The ends of member 22 are connected by transverse bottom member 26. At ends of members 22, 26 are vertical member 27 which are preferably outwardly convex and spaced about one third of the arcuate length of members 22 are outer outwardly convex vertical members 28 which connect members 22 and 24. The convexity of members 27, 28 causes the trap to roll over onto its bottom when it tends to come to rest in any other position. For the same purpose, preferably the members 28 are shorter than the member 27 causing the tops to slant downwardly-outwardly as shown in FIG. 2. The cage at the top and bottom is formed of parallel thin bars 29 which are perpendicular to members 23 and 26 and thus extend in the direction of the dumping of the catch and make it difficult for the catch to hang up in the trap. Thus dumping is speeded.

Generally, members 22, 28 are constructed of a relatively mild steel such as used in concrete reinforcing bars while the bars 29 may be of stainless steel or Monel metal. To prevent electrolytic action, the members 22, 28 are preferably either dipped in a plastic material or covered with windings of rubber tubing, or may be made entirely of plastic. Otherwise, electrolytic action might cause the deterioration of the metal and also set up electric charges which inhibit shellfish from entering the trap.

At the top of the trap are hinge members 31. As is shown in FIG. 7, hinge members 31 are formed of two halves 32 which are joined together at pins 33. Opposite pin 33, the halves are split at diagonal 34. Normally the hinges 31 are retained in place. However, as shown in FIG. 8, the hinges may be removed to stack the halves together rather than stacking the opened traps as is shown in FIG. 4.

Along one of the halves at the bottom is a transverse latch shaft 36 which is parallel to member 26 and spaced slightly inwardly thereof. The ends of shaft 36 extend through sleeves 37 which are welded to members 24. Fixed for oscillation with shaft 36 are latches 38 which are curved, as is best shown in FIG. 5, to extend over members 26 of the two halves and to latch under the member 26 of the farthest half. Handle 39 is connected to shaft 36 so that by swinging the handle 39 in a counterclockwise direction (as viewed in FIG. 5) the two halves may be unlatched, permitting the trap to spread apart to the position of FIG. 3 and similarly allowing the fish to fall downwardly towards container 56 (FIG. 3) positioned under the opening between the halves. The top edges of container 56 preferably have rollers on the four top edges upon which the trap rests.

The sides of the trap are formed of a mesh of relatively thin wire which is connected to the members 22, 24, as well as to the verticals 27, 28. The shellfish enter the trap through one of the tunnels 41 on either side.

The entrance to tunnels 41 is through rectangular outer frame 42 which extends between and is supported by outer vertical members 28. Interiorly of the trap is an inner frame 43 which is shorter in a vertical sense than frame 42. Thus, the sidewalls 44 of the tunnels 41 taper inwardly. To prevent the catch escaping, a latch 46 may be positioned vertically downwardly in the middle of the top of the inner frame 43 and gravity biased to closed position. As the fish enter, they deflect latch 46 inwardly and the latch is returned to down position after the fish have fallen out of the tunnel, the latch thus preventing the fish from crawling back into the tunnel and escaping. To retain the catch in the event the trap should come to rest inverted, a second latch 47 is positioned in the middle of the bottom of the inner frame 43. When the trap is inverted, the latch 47 is gravity biased closed.

Directing attention now to FIG. 4, by reason of the slope of top members 22 the traps in full-opened position nest together and the tunnels 41 nest within each other. This greatly reduces the amount of space required to stack the traps on the deck of the vessel. Alternatively, as shown in FIG. 8, the hinge members 31 may be taken off and half 21 stacked independently of the other.

In the use of the device, a perforated bait box 51 is filled with bait and its hook 52 is used to suspend the bait box in the center of the trap by hooking over one or both of the members 23. Thereupon, the trap is closed, latches 38 holding the trap in closed position. By means of a halter 53 which is connected to hinge members 31, a line is used to lower the trap to the bottom. If it tends to light on its top or its side, the curvature of members 27, 28 and the downwardly slanting of frame members 22 causes the trap to roll into position with the bottom downmost. As shellfish are attracted by bait in box 51, they enter through the tunnels 41, the latch 46 preventing their escape. After the catch has been obtained, the trap is pulled up by means of the line and halter 53 to the deck of the vessel, the fishermen using one handle 39 to open both latches 38. This opens the bottom of the trap as is shown in FIG. 3, allowing the catch to fall into container 56. Meanwhile, the bait box 51 is replaced with a fresh one and the trap is then closed and lowered to the bottom while the vessel proceeds to the next trap. Female and undersized shellfish are thrown back into the water while the boat is traveling between traps. The use of the bottom-opening trap makes it possible to empty the trap more rapidly and conveniently than the traps heretofore used.

After the season, or any other time when it is desired to remove the traps, traps are stacked on deck. In one form of the invention shown in FIG. 4, the hinge members 31 are not removed but are left in place. The halves of the trap are swung open and then nested on top of each other, the tunnels 41 likewise nesting. As an alternative, as shown in FIG. 8, the hinge members 31 are removed or at least opened and the two halves 21 separated, and individually stacked.

What is claimed is:

1. A shellfish trap comprising first and second halves, each said half having a semi-circular top frame having a transverse top center member, a semi-circular bottom frame larger than said top frame having a transverse bottom center member, said center members lying in a plane perpendicular to the plane of said bottom frame, said top frame converging outwardly toward said bottom frame, a plurality of outwardly convex vertical members interconnecting said frames including one said vertical member at each end of said center members, said center vertical members being longer than the vertical members outward of said center vertical members, whereby said frame tends to roll onto said bottom frame, first closure means closing said top and bottom frames and each being substantially planar, second closure means of arcuate shape closing the sides between said top and bottom frames, said second closure formed with an opening with its midpoint lying on a perpendicular to said plane of said center members, a tunnel extending from said opening radially inward of said half for entry of shellfish, hinge means hinging the top center members of said halves together, latch means for latching said bottom center members, and a halter for lifting said trap connected to said hinge means, whereby when said trap is suspended by said halter and said latch means is unlatched said halves open at the bottom for dumping.

2. A trap according to claim 1 in which said tunnel has an outer frame attached to a pair of said outer vertical members.

3. A trap according to claim 1 in which said hinge means comprises a pair of split links, each said pair comprising two halves and a pin pivotally connecting said halves together.

4. A trap according to claim 1 in which said latch means comprises a shaft in one of said halves parallel to said bottom center member and pivotally mounted on said bottom frame having at least two curved latches extending above the nearest bottom center member and around the outside of the bottom center member of the opposite half and detachably hooking thereunder.

* * * * *